(12) United States Patent
Welker et al.

(10) Patent No.: US 8,004,930 B2
(45) Date of Patent: Aug. 23, 2011

(54) METHODS AND SYSTEMS FOR DETERMINING COORDINATES OF AN UNDERWATER SEISMIC COMPONENT IN A REFERENCE FRAME

(75) Inventors: Kenneth E. Welker, Nesoya (NO); Svein Arne Frivik, Oslo (NO)

(73) Assignee: WesternGeco, L.L.C., Houston, TX (US)

( * ) Notice: Subject to any disclaimer, the term of this patent is extended or adjusted under 35 U.S.C. 154(b) by 603 days.

(21) Appl. No.: 12/049,923

(22) Filed: Mar. 17, 2008

(65) Prior Publication Data
US 2009/0231953 A1    Sep. 17, 2009

(51) Int. Cl.
*G01V 1/38*    (2006.01)
(52) U.S. Cl. ............................................ 367/16; 367/19
(58) Field of Classification Search .................. 367/16, 367/19; 701/214, 215; 342/357.31
See application file for complete search history.

(56) References Cited

U.S. PATENT DOCUMENTS

| | | | | |
|---|---|---|---|---|
| 5,031,159 | A * | 7/1991 | Rouquette | 367/125 |
| 6,954,175 | B1 * | 10/2005 | Cox | 342/357.31 |
| 7,433,264 | B2 * | 10/2008 | Vigen | 367/16 |
| 2003/0135326 | A1 | 7/2003 | Brown | |

OTHER PUBLICATIONS

China Develops Superior Underwater GPS System, webpage-CHINAdaily.com.cn, Jan. 11, 2004.
GIB-Lite:Underwater GPS made easy, webpage-http://www.underwater-gps.com/uk/products-positionning.php, ACSA.

* cited by examiner

*Primary Examiner* — Mark Hellner

(57) ABSTRACT

A method comprising determining coordinates of a first point rigidly attached to a rigid body floating on the sea surface in a desired coordinate reference frame; measuring orientation parameters of the rigid floating body to determine 3D offset in the coordinate reference frame of the first point to any point on or rigidly attached to the body; applying a 3D coordinate shift from the first point to a second point rigidly attached to the body, thus determining coordinates of the second point in the desired reference frame; determining a distance from the second point to one or more devices that are components of a seismic acquisition spread, by comparing transmission times of a signal to recording times of transmitted signals and multiplying by a signal propagation rate; and determining relative positions of components of the spread to each other and to devices rigidly attached to the rigid body.

30 Claims, 7 Drawing Sheets

METHODS AND SYSTEMS FOR DETERMINING COORDINATES OF AN UNDERWATER SEISMIC COMPONENT IN A REFERENCE FRAME

BACKGROUND OF THE INVENTION

Marine seismic exploration investigates and maps the structure and character of subsurface geological formations underlying a body of water. One or more streamer cables containing acoustic and/or electromagnetic (EM) seismic receivers are deployed into the water behind a vessel, and one or more sources may be towed by the same or different vessel. Less than perfect knowledge of the actual positions of the source at the time of firing and receivers at the time of arrival of reflected seismic waves may result in less than acceptable seismic data.

When performing marine seismic imaging of the subsurface strata one needs to establish the position and depth of the seismic source and the receivers (either acoustic or EM). Conventionally they have been referenced to the sea surface, but this has the disadvantage that the actual surface varies up and down with time and it is thus at a different distance from the seabed at the different times of the seismic experiments.

The Global Positioning System (GPS), administered by the United States, is a satellite-based positioning system useful in marine seismic exploration, and seismic surveys may employ multiple GPS receivers at strategic points in a spread to determine the surface position of a vessel, or buoys tethered to streamers and sources. However, this still does not provide knowledge of the actual position of the receivers on the streamers and the sources, as they are underwater and not at the surface. Thus, GPS has been used for surface positioning in marine seismic data acquisition, but one must still accurately relate the spatial position of GPS receiving antenna to underwater acoustic or EM equipment. Patent Cooperation Treaty publication no. PCT/WO/03/100451 A2 discloses a GPS-based underwater cable positioning system including a plurality of towed surface units and streamers. Each surface unit has a GPS receiver for determining its position, and an acoustic transmitter to transmit a signal representative of its position into the water. As described, acoustic receivers on the streamer cables receive the signal from the near surface transmitters and determine their position from the signals. These methods and systems can be expensive as each receiver must include the function of calculating its position from the signals it receives from the acoustic transmitters on the towed surface units; also, if one fails, the position data for that receiver is lost and that receiver (or the entire streamer cable) must be replaced, contributing to downtime and/or the need for further surveys.

Currently there are several ways used to relate an acoustic or EM measuring device to a satellite or radio antenna in seismic positioning networks. These include compass directions that represent the direction between the acoustic device and the antenna and an assumed (known) distance. In other previously known methods, an acoustic or EM transponder is affixed directly on the GPS buoy, or on a vertical pole extending into the water from the buoy having the GPS antenna, or towed by the buoy in a "fly behind" arrangement. In the aerospace and maritime industries it is common to combine high precision relative GPS signals between three antennae with a fixed baseline between them with an inexpensive solid-state component inertial system to sense 3D motion. GPS/inertial is an inexpensive and smaller equipment set than typical vessel gyros. The inexpensive inertial units have much higher drift rates than mechanical gyros but the drift is bounded by the high recalibration rate available from GPS. These methods have until now been adequate since the precision of satellite systems such as the GPS have been in the same neighborhood as the precision of the connections mentioned above, e.g., a few meters. Previous to the present disclosure, the initial position to within few meters of accuracy of an underwater component could be determined for instance by using GPS combined with an acoustic positioning system, such as a short-baseline (SBL) or ultra-short baseline (USBL) acoustic system. However, satellite-based systems have recently been largely improved in terms of precision. Methods of the present invention seek to take advantage of this improvement to relate spatial position of the satellite antenna to the underwater acoustic or electromagnetic device on the satellite level of precision, e.g., sub-meter, during one or more seismic and/or EM surveys.

SUMMARY OF THE INVENTION

In one aspect, the present disclosure describes a method comprising:
 a) determining coordinates of a first point (from example a satellite antenna) rigidly attached to a rigid body floating on the sea surface in an earth-centered earth-fixed or other desired coordinate reference frame;
 b) measuring sufficient orientation parameters of the rigid floating body to determine a 3D offset in the coordinate reference frame of the first point to any point on or rigidly attached to the rigid body;
 c) applying a 3D coordinate shift from the first point to a second point (for example an acoustic device) rigidly attached to the body floating on the sea surface and thus determining the coordinates of the second point in the desired reference frame of the first point;
 d) determining on a shipboard computer a distance from the second point fixed to the rigid body to one or more devices that are components of a marine seismic acquisition spread, by comparing transmission times of a signal to recording times of transmitted signals and further multiplying by a signal propagation rate; and
 e) determining relative positions of components of the marine seismic spread to each other and to the devices rigidly attached to the rigid body floating on the sea surface in the desired coordinate reference frame.

In certain embodiments, the determining of relative positions is by acoustic ranging, and the first and second devices are acoustic components. In certain embodiments the orientation parameters are selected from the group consisting of pitch, roll, yaw, heading, and combinations thereof. In other embodiments the rigid body is selected from the group consisting of a buoy and a seismic source float. In other embodiments the buoy is selected from the group consisting of a steerable buoy and a non-steerable buoy. In certain embodiments the 3D offset is determined sufficiently to provide sub-meter accuracy in the determination of the 3D offset. As used herein the term "sub-meter" means the accuracy is within plus or minus 1 m or less, for example within plus or minus 0.9 m, or plus or minus 0.8 m, plus or minus 0.5 m, or plus or minus 0.3 m, or even plus or minus 0.1 m.

In certain embodiments the rigid body may be a buoy, for example one or more streamer tail buoys or streamer front end buoys. The buoys may be simply towed by a vessel or streamer (having no power or steering mechanism integral therewith, i.e. only passively steerable), or may be actively steerable. "Actively steerable" means a device comprising its own mechanism for changing its position, such as a rudder, one or more wings, hydrofoils, ailerons, and the like, and does not include passively steerable devices. An actively steerable device receives one or more control signals from a remote, local, or combination of remote and local devices, either by wire or wireless transmission, indicating what changes in position are desired. "Actively steerable" does not include devices able to be steered only by virtue of being connected to another device which is actively steerable, such as a marine tow vessel, work vessel, ROV, AUV or similar vessel.

In certain embodiments the component of the underwater network is a part of a single streamer and the acoustic ranging is performed between sections of the streamer. In other embodiments the components are more than one streamer and/or a seismic source, and the relative positions determined are relative positions between two or more streamers or gun strings. The steamers may comprise acoustic seismic sensors, electromagnetic (EM) sensors, or both. In certain embodiments measuring motion of the rigid body comprises using one or more components of inertial measuring units, such as accelerometers, gyroscopes, and the like. In certain embodiments measuring a sufficient number of orientation parameters of the rigid body comprises measuring at least three parameters along orthogonal axes. The three parameters may be a) three satellite antennae; b) two satellite antennae and one compass reading; c) three inertial measuring units; d) two inertial measuring units and one satellite antenna; e) one inertial measuring unit and two satellite antennae; f) an inertial navigation system; g) an attitude heading reference system; and h) an attitude heading reference system corrected using one of the satellite antennae; or other combinations. Combined or integrated inertial measurement units with satellite positioning systems ("IMU/GPS") for an inertial navigation system ("INS") and so-called "attitude heading reference systems" ("AHRS") may be used. An AHRS may comprise solid-state or microelectro-mechanical system ("MEMS") gyroscopes, accelerometers and/or magnetometers on all three axes of rotation (x, y, and z). Some embodiments of AHRS may use satellite positioning receivers to improve long-term stability of the gyroscopes. A filter such as a Kalman filter may be used to combine information from these multiple measurement units.

In certain embodiments measuring motion of the rigid body comprises measuring orientation of at least three satellite antennae fixed to the rigid body. In other embodiments measuring motion of the rigid body comprises measuring heading, inclination to vertical in cross line and inline tow directions. In general, the reference frame of the measurement is not critical since the relations between the coordinate reference frames are known either by definition or through measurements on the rigid body.

In another aspect, the present disclosure describes a method comprising:
a) determining the coordinates of a first point (for example a GNSS antenna) rigidly attached to a rigid body floating on the sea surface in an ECEF or other desired coordinate frame;
b) measuring a sufficient number of orientation parameters of the rigid floating body to determine 3D offset in the coordinate reference frame of the first point to any point on or rigidly attached to the rigid body;
c) applying the 3D coordinate shift from the first point to a second point (for example a tail buoy adaptor section tow point) rigidly attached to the body floating on the sea surface and thus determining the coordinates of the second point in the desired reference frame of the first point;
d) determining on a shipboard computer (or with some other in-sea central processing unit) a 3D coordinate shift using distance, inclination, and heading from the second point to one or more components of the towed underwater seismic spread (this is a spherical coordinate shift; by measuring the distance, inclination, and heading in the desired reference frame, from a point on the buoy to a point under the water that is also a component of the towed underwater spread, dx, dy, and dz can be computed (see for example http://en.wikipedia.org/wiki/Spherical_coordinates)); and
e) determining relative positions of two or more components of a towed underwater seismic spread to each other and to one or more components the towed underwater seismic spread determined in d).

The underwater components may be acoustic transmitters, receivers, or transducers, or some other component, such as an inclinometer, pressure gage, or compass, a point on a seismic source or an EM transmitter or receiver, in or on one of the streamers. Systems for carrying out the methods are also described and are another aspect of the present disclosure. The described methods and systems may be used in 3-D and 4-D marine seismic data acquisition, wherein the data may be selected from seismic data, EM data, and both seismic and EM data.

BRIEF DESCRIPTION OF THE DRAWINGS

The manner in which the objectives of the invention and other desirable characteristics may be obtained is explained in the following description and attached drawings in which:

FIGS. 10 and 11 have an inclinometer error of 2 degrees compared to 1 degree in the plots of FIGS. 8 and 9;

FIG. 11 is a zoomed in view of a portion of FIG. 10, and shows that depth is most valuable at steeper inclinations.

Figure 1:
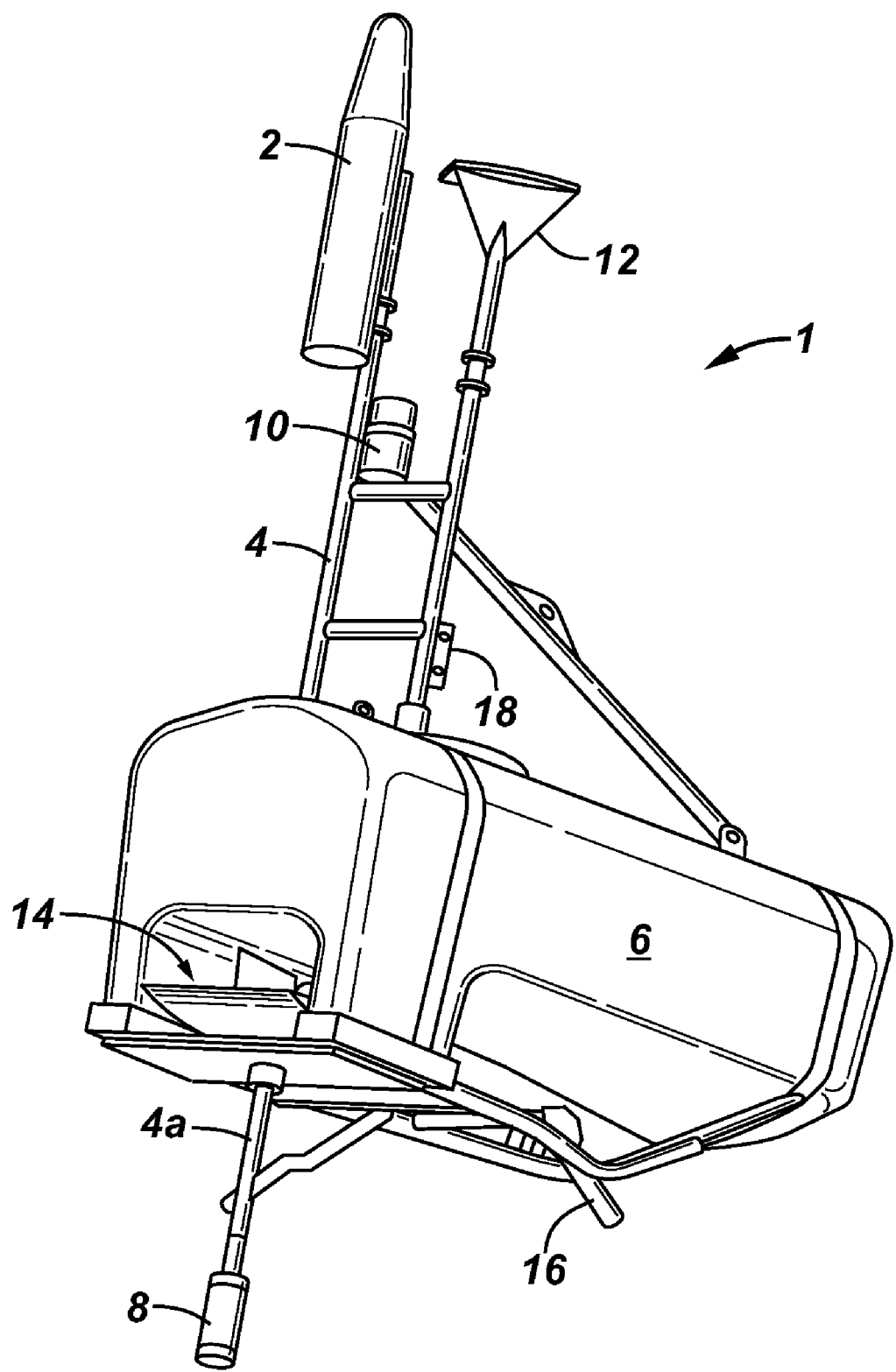
FIG. 1 illustrates a simplified schematic perspective view of a system of the invention.

It should be understood that the figures are highly schematic in nature, and that with regard to FIG. 1, many other embodiments are possible.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In certain embodiments, seismic streamers are positioned relative to each other by acoustic ranging. These relative positions are then related to an earth fixed coordinate reference frame, navigation reference frame, body reference frame, or other reference frame typically provided by satellite (for example, GPS, GLONASS, or other satellite positioning system, or combination thereof) control points on towed buoys (tail or streamer front buoys) on the sea surface above the submerged streamers. An acoustic device is employed that determines a distance from the towed buoy to one or more of the submerged components (whose relative positions are known). The physical connection or tie between the satellite antenna and the acoustic device is a key component of positioning accuracy. The physical offsets must not change in length (more than a few centimeters) over the course of the positioning methods.

The present disclosure describes motion measurement devices that improve the accuracy of determining the spatial relation between the GPS or other satellite antenna and one or more acoustic distance measuring devices that make up part of the acoustic network. To avoid unnecessary repetition herein we use the term GNSS as a generic term for global navigation satellite systems. For purposes of the present disclosure, methods other than GNSS may be employed for precise antenna (or other device) location. These methods have existed for some time, and include microwave distance measuring systems, laser distance measuring systems and photogrammetric techniques. These methods indirectly relate the vessel antenna to points on the sea surface, such as targets affixed to streamer front and tail buoys.

Certain systems disclosed in this disclosure employing measurements that relate a GNSS antenna position to one or more acoustic devices that make up part of the seismic spread acoustic network are described in reference to the buoy 1 illustrated in FIG. 1, which illustrates a GNSS antenna 2 fixed to a rigid body 4. Buoy 1 includes a floatation body 6. Buoy 1 includes an underwater acoustic device 8 (transmitter, receiver or transponder), which is also fixed to a short portion 4a of rigid body 4, and therefore fixed in relation to GNSS antenna 2, at least during times of measurement. Portion 4a may be permanently positioned as illustrated in FIG. 1, or may be retracted toward (and even onto a cut-out portion of) floatation body 6 when not in use, and extended when required. The length of portion 4a may be a fraction of the length of portion 4 which supports GNSS antenna 2, for example 0.5×, or 0.25×, or even 0.1× the length of support 4. Mechanisms for retracting and extending portion 4a may be manual or automated and if automated may be motor-, hydraulically- or pneumatically-assisted. Any of the components may be connected to buoy 1 by quick-connect/quick disconnect fasteners. It is common to include a light 10 and a radar antenna 12 on such floating structures, but these and other features, such as solar power panels, are not necessary to practice the various embodiments described herein. Buoy 1 may or may not include steering features, such as a diving plane 14 and rudder 16.

Using the 3D fixed offset of underwater acoustic device 8, which is fixed to rigid body portion 4a, and therefore fixed in relation to GNSS antenna 2, a body coordinate frame transformation is made to derive the desired reference frame coordinates (such as Earth Centered Earth Fixed (ECEF) reference frame) of acoustic device 8 based on the measured motion of buoy 1. Coordinate transformations may include translation. If we think of the GNSS antenna as the origin of the rigid body coordinate frame, the translation step comes from giving the antenna coordinates in the ECEF reference frame. This step is computed by the GNSS receiver and algorithms. Since the body is rigid, the dx, dy and dz shifts are known in the rigid body reference frame to any other point on the rigid body. So the only thing left is to reduce the translation to their equivalent shifts in the ECEF reference frame (or other desired reference frame). Measurement of angles and rotation matrices are used for this step. These translations and shifts using rotation matrices are readily known to those of skill in the art and require no further explanation herein.

In certain embodiments, the measured system motion may be obtained by an inertial measurement unit (IMU), designated in FIG. 1 at 18, which is fixed to any part of buoy 1, but in certain embodiments closest to the center of mass and in the embodiment of FIG. 1, to rigid body 4. IMU 18 is a closed system that is used to detect acceleration and attitude (pitch and roll), heading, and yaw motion of the rigid body. IMU 18 can measure the motion of the rigid frame in which the GNSS antenna and acoustic device are fixed. This has the advantage of giving the rigid body reference frame position and orientation during short periods of GNSS outage.

In certain embodiments it may not be necessary to detect all of attitude (pitch and roll), heading, and yaw motion of the rigid body. For example, in calm seas there may be very little pitch, or very little roll, so that accuracy may not be affected negatively by ignoring one or more of the motions. In certain embodiments the buoy may have a keel along the buoy centerline that keeps the buoy parallel to the direction of motion so that the orientation of the buoy centerline is equal to the course traveled by the GNSS antenna, eliminating the need for a compass or yaw measurement.

IMU 18 may comprise three accelerometers and three gyroscopes inside of a housing. The accelerometers are placed such that their measuring axes are orthogonal to each other. They measure the inertial acceleration (sometimes referred to as "G-forces" Three gyroscopes are placed in a similar orthogonal pattern, preferably aligned with the accelerometer axes, and measuring rotational rates (meaning how the body they are attached to is rotating in reference to the Earth's gravity). In certain embodiments one or more temperature sensors may also be included, which are sometimes already incorporated into each accelerometer or gyroscope component. The walls of the housing may be made of materials that minimize electromagnetic interference. If the output signals are analog, a major concern is shielding the cables and analog to digital converter from electrical noise. If the output data is already in digital format, then time delays become the major concern. In certain embodiments the IMU may be combined with the acoustic device 8 in the same housing, in which case it is underwater. In these embodiments one would ensure that the IMU components are protected from any deleterious effects of the water environment.

In these embodiments, a ship-board sub-system, which may be integrated with the vessel's navigation computer, or a non-integrated, stand-alone computer, is typically used to update the position calculation based on the measured six degrees of freedom (three linear motion and three rotational motions). In certain methods and systems of the invention the computer may be on-board the buoy, source float, or located remote therefrom, for example on a streamer tow vessel, work vessel, ROV or AUV.

In another embodiment, a second type of motion measurement system comprising three or more GNSS antennae may be used. The antennae are fixed in relation to each other and the rigid body so that the orientation of the system of antennae can be determined with respect to the chosen reference frame (e.g. ECEF coordinate frame) and give the coordinates of the acoustic device in the selected reference frame.

In another embodiment, the heading of the rigid body and the inclination to the vertical in cross line (roll) and in line (pitch) towed body directions are measured. In these methods, an inclinometer may be used to measure roll, and another inclinometer used to measure the pitch of the rigid body. Heading may be measured using a compass or gyrocompass.

These measurement types can also be combined for a more robust and accurate acoustic device position estimate. For example, IMUs notoriously experience drift. Drift can be compensated for by use of two or more GNSS antennae. In other embodiments, multiple IMUs may be employed.

In certain embodiments, the motion of the acoustic device may be modeled and the information used in the motion determination. The motion encountered will be driven largely by wave energy which has a distinct frequency band. Filtering the measurement noise resulting from whatever suite of instruments are used for the motion measurements should be accomplished by fitting the motion to ocean wave frequency band. Any form of filtering of this noise may be employed. In certain embodiments a motion model will likely be employed to remove noise spikes not representative of the true acoustic device position.

Figure 2:
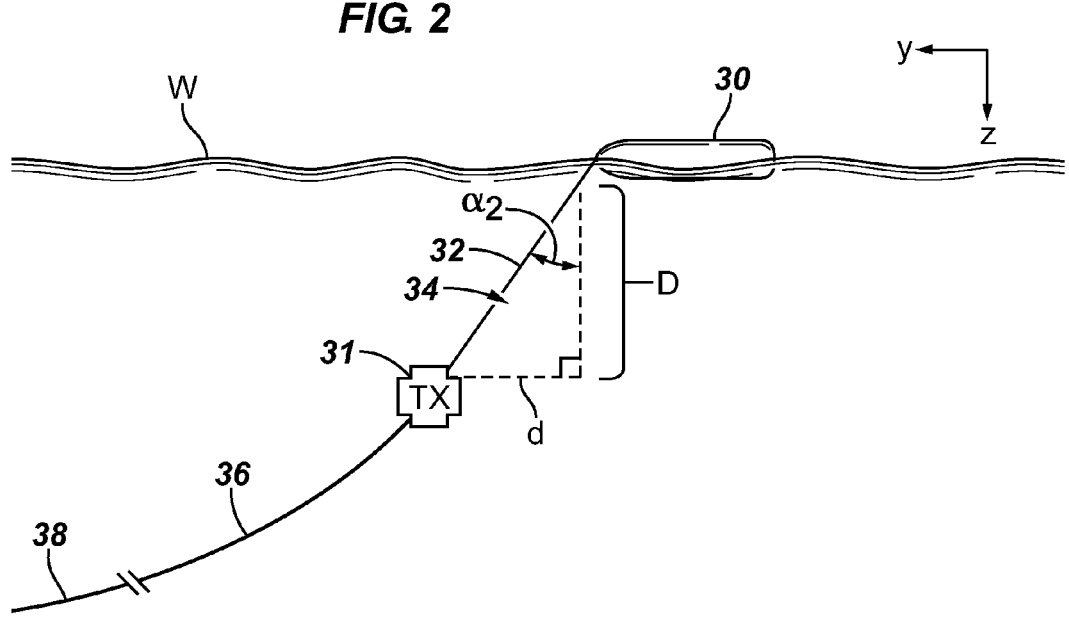
FIG. 2 illustrates a how a slant range may be mathematically converted to a planar range.
Figure 3:
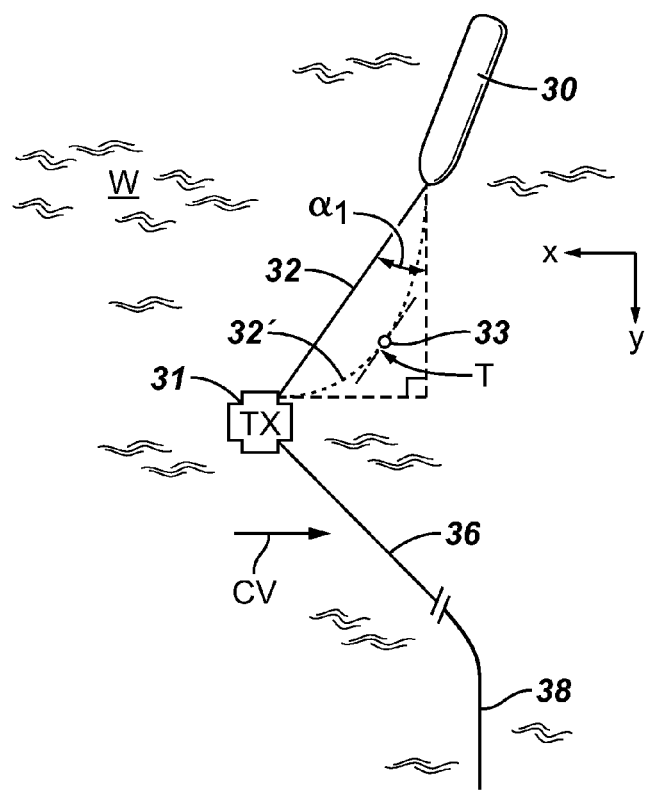
FIG. 3 illustrates direction determination using a compass.

In another method and system embodiment, inclinometers, pressure sensors to determine depth, and a compass may be employed as described herein in relation to FIGS. 2 and 3. These instruments may be integrated in or attached to a section between the rigid body on which one or more GNSS antennae (one antenna is sufficient in certain embodiments) are mounted and an acoustic node in the seismic network. One advantage of this method is that it relates the GNSS antenna point and acoustic points without having an acoustic node rigidly attached to the rigid body floating on the surface. A rigid attachment of an acoustic device to a rigid body floating on or near the surface of the body of water has caused, in certain instances, acoustic performance problems for transmission or reception of acoustic signals, as the deeper the transmitter or receiver the better the acoustic signal. Acoustic devices near the ocean surface are contaminated by sea surface noise and surface reflections, and apparatus such as a rigid pole attached to a floating surface device such as a tail buoy poses a towing risk as the pole may encounter debris in the ocean during tow and be damaged. Further a deployment and retrieval solution is needed to protect the pole and acoustic device during these operations.

FIG. 2 illustrates a how a slant range may be mathematically converted to a planar range, while FIG. 3 illustrates direction determination using a compass. Referring first to FIG. 2, a seismic streamer tail buoy 30 floating on water surface W is connected to an underwater acoustic transmitter 31 via a tail buoy adapter section 32. Acoustic transmitter 31 is in turn connected to a streamer stretch section 36, in turn connected to a marine seismic streamer 38, which may include streamer controllers and a variety of seismic sensors, such as hydrophones and geophones, as known in the art. Note that the streamer stretch section and tail buoy adapter section may not be necessary in all embodiments, and these components are merely one example of implementation of the methods and systems.

An inclinometer 34 measures a slant angle α2, the slant angle of tail buoy adapter section 34. Slant range is reduced to planar range by knowing the length of tail buoy adapter (TBA) section 34 and measuring slant angle α2. Inclinometer 34 gives the tangent along the tail buoy adapter section 32 if attached or integrated therein substantially near the midpoint of the tail buoy adapter section 32. The planar distance ("d" is two dimensional distance) is then calculated as in Equation 1:

$$d = (TBA) \times \sin(\alpha 2) \tag{1}$$

Depth "D" can also be used to determine the 2-dimensional distance given the TBA distance by Equation 2:

$$d = ((TBA)^2 - D^2)^{1/2} \tag{2}$$

FIG. 3 illustrates determination of compass angle α1, which leads to crossline position determination of underwater acoustic transmitter 31. Tail buoy adapter section is illustrated as taught by a straight line 32 and as slack by a dotted curve 32'. Acoustic device 31 is positioned between tail buoy adapter section 32 and a streamer stretch section 36. Wind vector and current vectors are indicated by arrows WV and CV, respectively. The length of the arrow indicates the magnitude of the vector. Note that the magnitude of the wind vector WV and current vector CV may be the same or different, and in the implementation indicated in FIG. 3 they are different. A compass 33 is indicated attached or integrated into tail buoy adapter section 32 substantially near its midpoint. This compass provides the tangent T along the curve 32' that is parallel to the true direction of the acoustic device 31 when viewed from tail buoy 30.

The methods and systems implemented herein are improvements over known methods largely in the instrumentation used. Until this disclosure, it was common to simply assume an inclination and straightness of a tail buoy adaptor section of a marine seismic tail buoy, and obtain the direction from a compass mounted on a deep towed body up to 70 meters away from the tail buoy adaptor section.

Length Error Analysis (Although the following discussion focuses on using a fixed distance on a tail buoy adapter section, to should be noted that distance can be measured using transmission/reception of signals, for example using an acoustic transmitter on the buoy and a receiver on the tail buoy adapted section (or some other location), and comparing transmission and recording times of signals.) When using a flexible section, such as a tail buoy adaptor section, it is likely the length error due to section flex will typically be shorter (e.g., when the section in not fully extended due to a temporary relaxation in the tension, when surfing down a wave for example) and may be slightly longer only when the tension is increased, (e.g., perhaps when the buoy encounters a wave during tow). The magnitude of these distance errors are difficult to predict without some tests, but are expected to be most often less than 10 centimeters.

Figure 4:
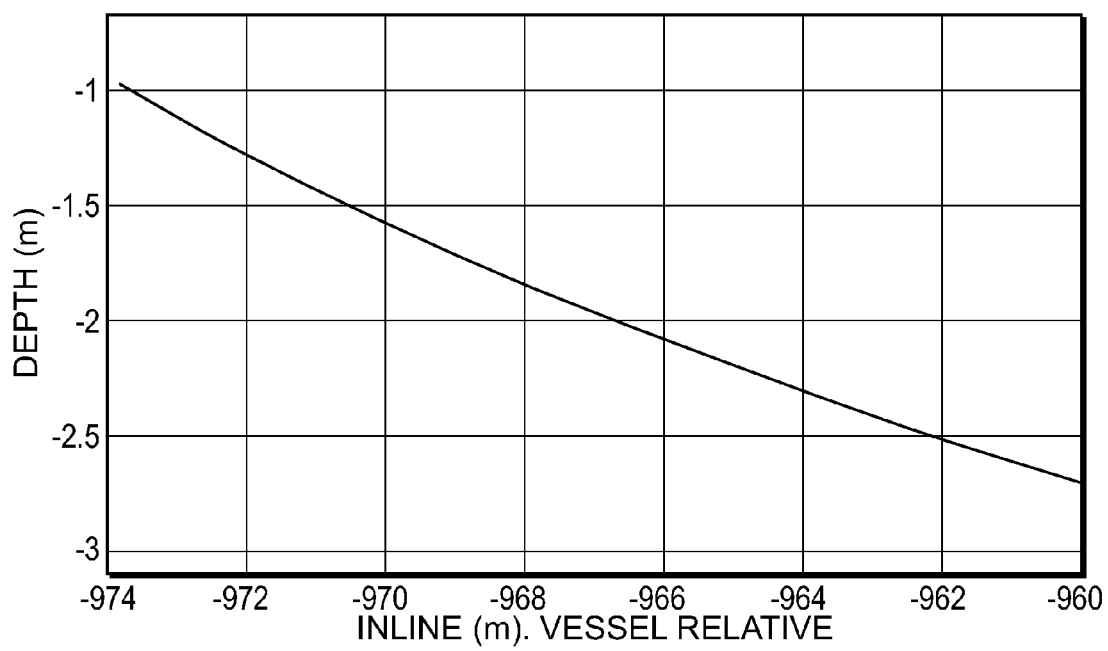
FIG. 4 illustrates a portion of simulation results the first 13 meters from the tail buoy and down to where the acoustic transmitter is located according to the present disclosure.

FIG. 4 illustrates the first 13 meters from the tail buoy and down to where the acoustic transmitter is located according to the present disclosure. This illustration is based on a simulation that accounts for the physical forces thought to be on the section. The difference between 13 meters along this curve and a straight line between the endpoints of this simulated curve is less than 2 cm. If this curve is representative of the type of distance errors that can be expected, the error modelling is perhaps too pessimistic at 10 cm.

The angular error may very well be restricted to the normally distributed errors associated with the instrument.

Error Propagation for Length of Tail Buoy Adaptor (TBA), Heading and Inclination In order to account for the error correlation between the tail buoy adapter length, inclinometer and compass, the following more complete development is offered by Equations 3 and 4:

$$\Delta y = (TBA) \times \cos(\alpha 1) \times \cos(\alpha 2) \tag{3}$$

$$\Delta x = (TBA) \times \sin(\alpha 1) \times \cos(\alpha 2) \tag{4}$$

where;

Δy is the inline distance from the tail buoy tow point to the device of interest, for example an acoustic device;

Δx is the cross line distance from the tail buoy tow point to the device of interest, for example an acoustic device;

"TBA" is the length of the tail buoy adaptor section;

α1=compass heading; and

α2=inclinometer measurement.

Figure 5A:
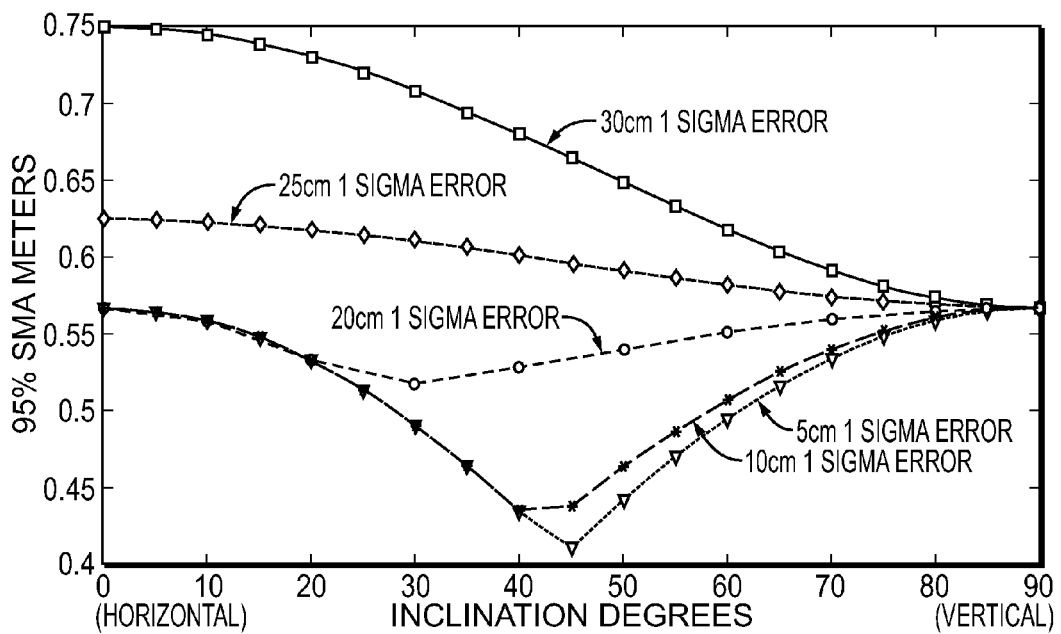
FIGS. 5A and B illustrate the behaviour of change for the 95% semi-major axis (SMA) with different length errors and inclinations.

The plot in FIG. 5A shows the behaviour of change for the 95% semi-major axis (SMA) with different length errors and inclinations. The error in heading and inclination is modelled as 1 degree 1 sigma. Because only the direction of the SMA changes with heading, but not the magnitude, heading is not varied. Length error is varied as indicated in the legend. As indicated in the plot, the total horizontal error due to length disappears in the vertical and becomes vertical error only. In the horizontal, length error only becomes relatively important after around 20 cms when combined with the 1 degree heading and inclination errors, but then grows rapidly. In between horizontal and vertical there are two cases illustrated. The first case is for large length errors that start out so high that they never drop below the error level at vertical. In other words, they continue to decline until the vertical.

Figure 5B:
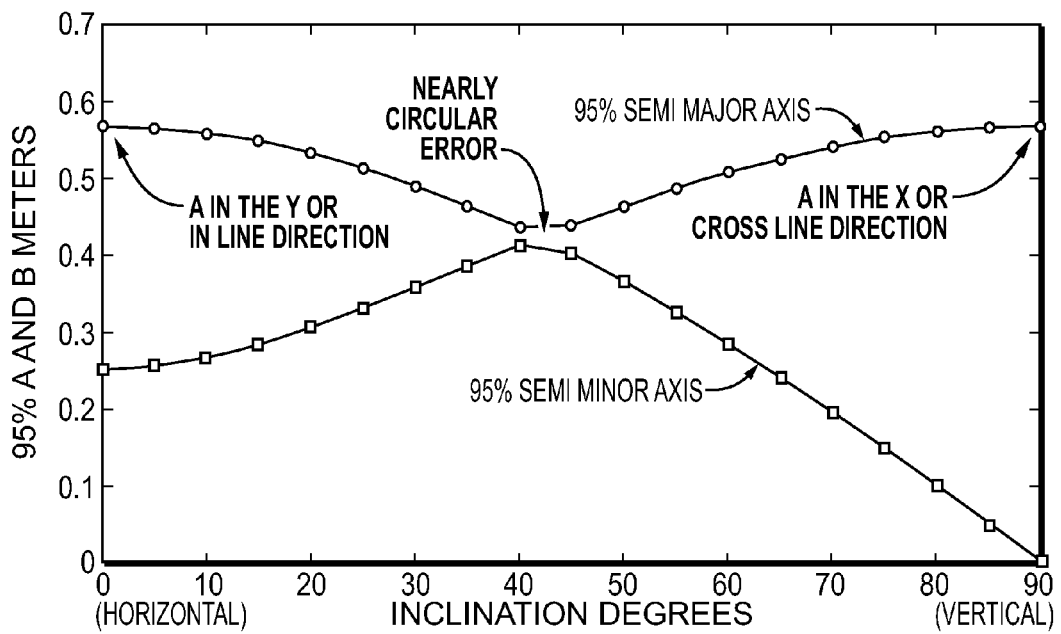

The second case, shown in FIG. 5B, is with SMA's that are dominated by heading and inclination error at either end of the plot. At horizontal, the semi-major axis is largest in the in line direction until around 45 degrees inclination. A shrinks until it is nearly equal to B, giving a nearly circular error. Then the direction of increase for A is cross line, and A increases again towards its maximum, or most elliptical shape, which is when B shrinks. This is illustrated in FIG. 5B for 10 centimeters of error in length.

In certain implementations it is contemplated that the acoustic device will be combined with a streamer controller such as that known under the trade designation Q-FIN, described in U.S. Pat. No. 6,671,223, or other streamer controllers, such as that described in U.S. Pat. No. 6,011,752, both of which are incorporated herein by reference. In these embodiments, using the streamer controller to regulate the depth of the acoustic device could be useful for controlling the inclination.

An additional method of controlling the length and shape of the length between the tail buoy and the acoustic device is to make it rigid or nearly so. The shorter the length from the tail buoy to the acoustic device the better, and to control the depth a streamer controller such as that known under the trade designation Q-FIN as described above could be used. So for example instead of a 10-15 meter flexible section, a 3 meter rigid section could be made with one inclinometer and a compass built in or attached thereto. These embodiments are a compromise between a rigid pole mounted on the tail buoy and the flexible section that may give the advantage of both without the disadvantages of either. A rigid member, such as a tube, pole, or mount member requires considerable engineering and/or towing and handling risk, and the flexible section giving a somewhat reduced accuracy.

Depth Measurement Analysis

Using the information in FIGS. 2 and 3, the following observations equation can be formed:

$$d=\sqrt{(TBA)^2-D^2} \quad (5)$$

where "d" is the variable horizontal distance. This computed observation can be added to the equations (3) and (4) for Δx and Δy above.

A better way to formulate the equations is to use depth to compute the inclination angle as follows:

$$\alpha2=\arccos(D/(TBA)) \quad (6)$$

Figure 6:
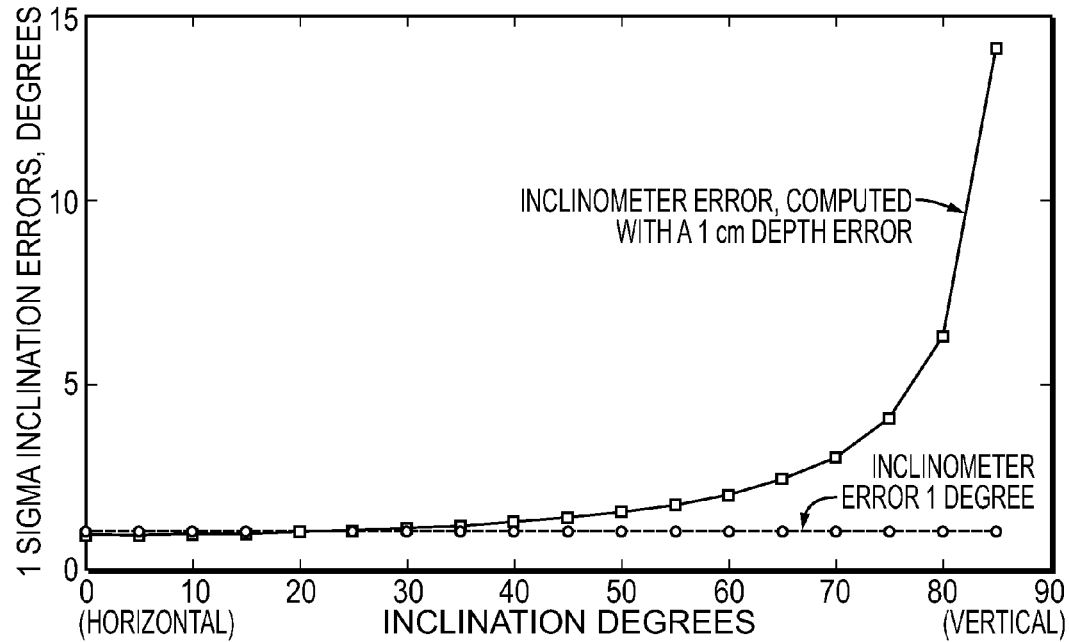
FIG. 6 illustrates the improvement using depth can give even in the nearly vertical orientation.
Figure 7:
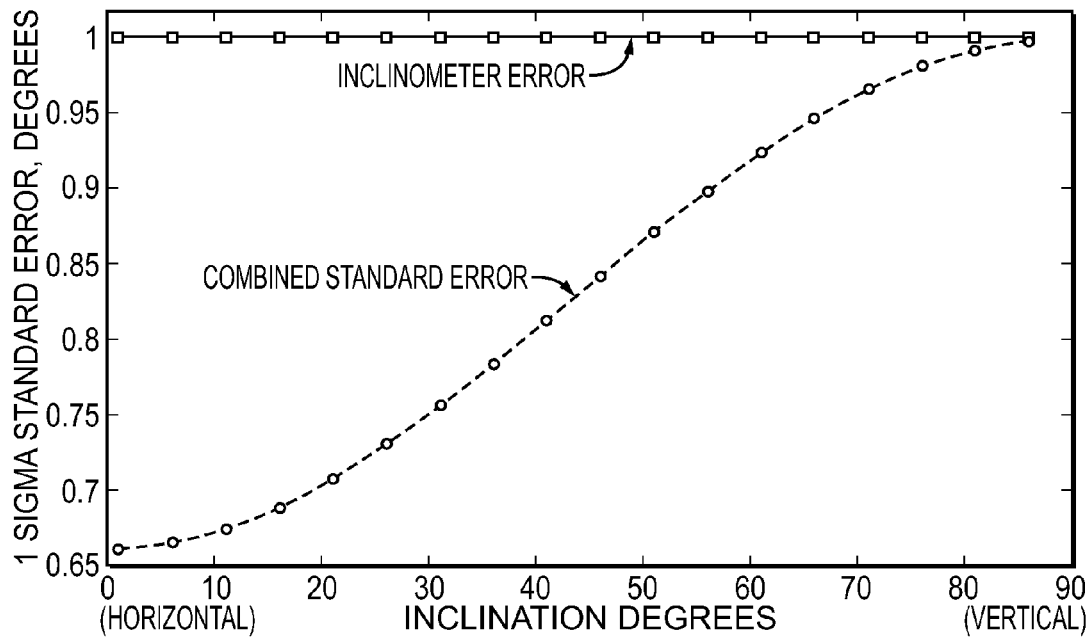
FIG. 7 is a plot showing that the value of a depth sensor is greatest near the horizontal.
Figure 8:
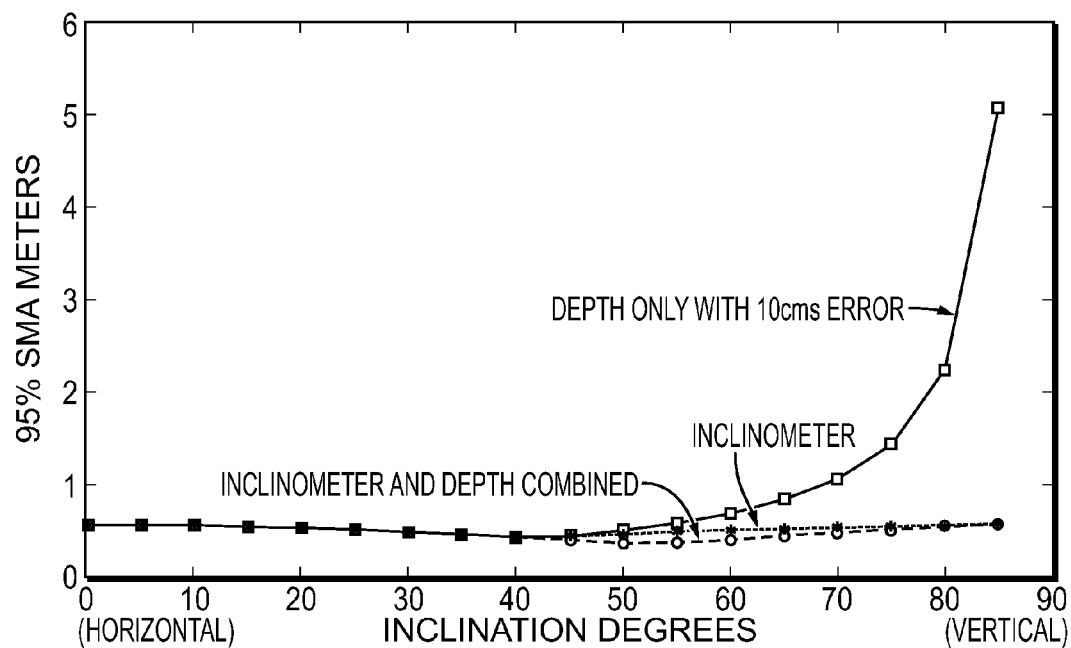
FIG. 8 illustrates that the combined error is smallest in the horizontal, illustrated in the semi-major axis (SMA) domain; The plots of FIGS. 10 and 11 have an inclinometer error of 2 degrees compared to 1 degree in the plots of FIGS. 8 and 9.
Figure 9:
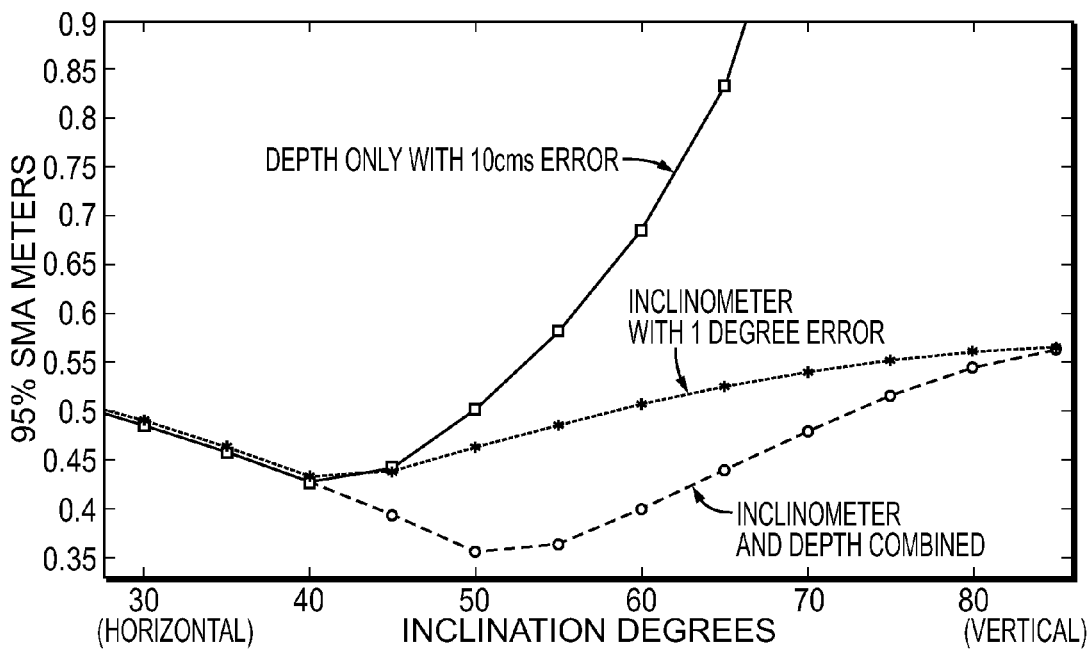
FIG. 9 is an enlarged or zoom view of a portion of FIG. 8, showing some advantage to using depth, but most advantage with having both measurements.
Figure 10:
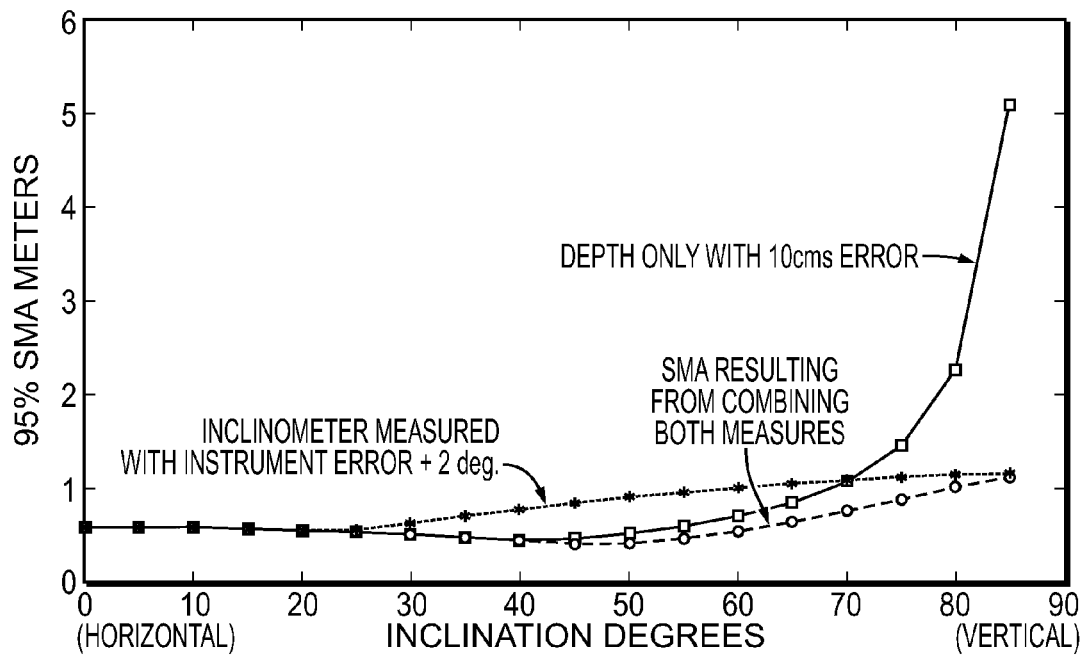
Figure 11:
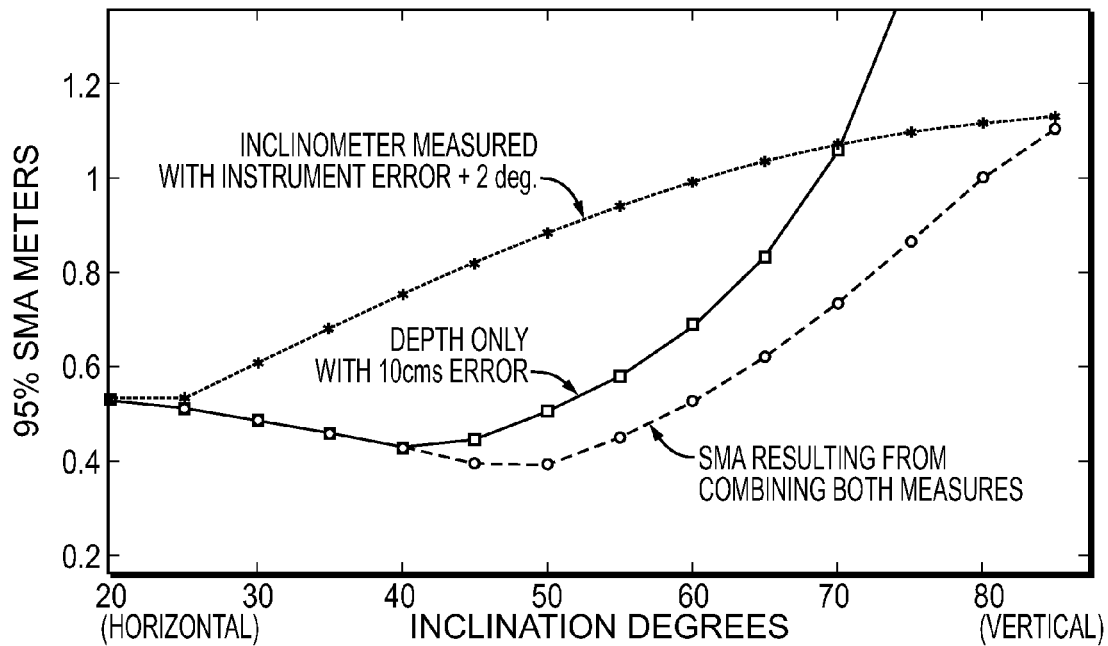
FIG. 11 is a zoomed in view of FIG. 10, and shows that depth is most valuable at steeper inclinations.

This formulation allows us to evaluate the improvement using depth can give even in the nearly vertical orientation, and this is shown in the plot of FIG. 6. (The problem with the formulation of Equation (5) is that as (TBA) approaches the value of depth D, near vertical, the value (d) approaches zero. The value (d) appears in the denominator of some of the partial differentials used to calculate errors.) The uncertainty of the computed inclination is derived from the uncertainty of the depth and TBA length. In the following analyses the depth uncertainty is 20 cm, which is about 6 percent of the depth of 3 meters expected according to the cable simulations shown above. The plot in FIG. 6 illustrates how a 1 sigma computed standard error for an inclination angle looks compared to the 1 degree used in the analysis above. Depth and TBA length errors were modeled as 10 centimeters. As seen in FIG. 7, the value of the depth sensor is greatest near the horizontal. The combined error is smallest in the horizontal. The plot in FIG. 8 shows how this looks in the SMA domain. For inclinations expected for a TBA, there is little or no advantage between knowing the inclination or depth, or both. But for steeper inclinations, a zoom view of FIG. 8 (FIG. 9) shows some advantage to using depth, but most advantage with having both measurements. The value of depth information becomes more valuable as the uncertainty of the inclinometer measurement increases. The plots of FIGS. 10 and 11 have an inclinometer error of 2 degrees compared to 1 degree in the plots of FIGS. 8 and 9. FIG. 11 is a zoomed in view of FIG. 10, and shows that depth is most valuable at steeper inclinations.

In sum, the tie between the satellite receiver and acoustic receiver (or other point in the spread) depends on some form of measurement of direction and inclination, and it seems logical to investigate what can be achieved with these types of measurements.

One system for carrying out methods described herein include a seismic data acquisition system comprising a towed marine seismic spread, the spread comprising a plurality of underwater seismic components; a rigid body floating on a surface of a body of water above the underwater seismic components; means for determining coordinates of a first point rigidly attached to the rigid body in a desired coordinate reference frame; means for measuring sufficient orientation parameters of the rigid body to determine a 3D offset in the coordinate reference frame of a first point to any point on or rigidly attached to the rigid body; means for applying a 3D coordinate shift from the first point to a second point rigidly attached to the body floating on the sea surface and thus determining the coordinates of the second point in the desired reference frame of the first point; a shipboard sub-system computing a distance from the second point fixed to the rigid body to one or more devices that are components of the spread, by comparing transmission times of a signal to recording times of transmitted signals and further multiplying by a signal propagation rate, and determining relative positions of components of the marine seismic spread to each other and to one or more of the devices rigidly attached to the rigid body floating on the sea surface in the desired coordinate reference frame. The means for determining coordinates of a first point may be GNSS-based equipment, microwave distance measuring systems, laser distance measuring systems and photogrammetric systems. The means for measuring sufficient orientation parameters of the rigid body may include optical and electromagnetic angle measuring devices, inertial units such as accelerometers, magnetic compasses, and the like. The means for applying a 3D coordinate shift may be a digital computer, handheld computing device, mainframe computer, and the like. The shipboard sub-system may be a dedicated or undedicated digital computer or handheld computing device, and may be integrated with a shipboard navigation computer and/or positioning computer. Other systems of the invention may include a shipboard sub-system computing a 3D coordinate shift using distance, inclination, and heading from the second point fixed to the rigid body to one or more devices that are components of the spread, and determining positions of two or more components of the towed underwater seismic spread relative to each other and to one or more points on the rigid body in the desired coordinate reference frame. In these embodiments, the shipboard sub-system may be a dedicated or undedicated digital computer or handheld computing device, and may be integrated with a shipboard navigation computer and/or positioning computer. Means for measuring distance are known in the art and include acoustic, optical (for example laser), photographic, and electromagnetic equipment. Means for measuring inclination include inclinometers, pressure differential measuring devices, and the like. Means for measuring heading include compasses (including digital compasses), magnetometers, and the like.

Uncertainty in simulated computed inclinations is derived from uncertainty of the depth and tail buoy adapter length in addition to an inclinometer.

Position data may be recorded and/or transferred to a central recording/computer system through the tail buoy adapter section and streamer sections.

Methods and systems disclosed herein may be optimized taking into consideration local sea current vector information. These may be measured in situ by a current meter. Marine currents are a significant limitation for the efficiency of marine seismic surveys and positioning systems.

Methods and systems described herein may include measurement, calculation and other sub-systems useful in implementing methods of the invention. Calculation units may include software and hardware allowing the implementation of one or more equations, algorithms and operations as required, as well as access databases, data warehouses and the like, via wire or wireless transmission. The direction and speed of the water flow past a sensor unit, (i.e., current relative to the sensor unit) may be determined within a common absolute reference frame, such as the World Geodetic System-1984 (WGS-84).

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A method comprising:
   a) determining coordinates of a first point rigidly attached to a rigid body floating on the sea surface in an earth-centered earth-fixed or other desired coordinate reference frame;
   b) measuring sufficient orientation parameters of the rigid floating body to determine a 3D offset in the coordinate reference frame of the first point to any point on or rigidly attached to the rigid body;
   c) applying a 3D coordinate shift from the first point to a second point rigidly attached to the body floating on the sea surface and thus determining the coordinates of the second point in the desired reference frame of the first point;
   d) determining on a shipboard computer a distance from the second point fixed to the rigid body to one or more devices that are components of a marine seismic acquisition spread, by comparing transmission times of a signal to recording times of transmitted signals and further multiplying by a signal propagation rate; and
   e) determining relative positions of components of the marine seismic spread to each other and to one or more of the devices rigidly attached to the rigid body floating on the sea surface in the desired coordinate reference frame.

2. The method of claim 1 wherein the orientation parameters include yaw and a member selected from the group consisting of pitch, roll, heading, and combinations thereof.

3. The method of claim 1 wherein the rigid body is selected from the group consisting of a buoy and a seismic source float.

4. The method of claim 1 where the transmitted signal is selected from acoustic signals and electromagnetic signals.

5. The method of claim 1 where the second point on the rigid floating body is selected from the group consisting of a signal transmitter, a signal receiver, and a transducer.

6. The method of claim 1 wherein the first point is an antenna.

7. The method of claim 1 wherein the 3D offset is determined sufficiently to provide sub-meter accuracy in the determination of the 3D offset.

8. The method of claim 1 wherein the seismic spread is a single streamer and acoustic ranging is performed between sections of the streamer.

9. The method of claim 1 wherein the seismic spread comprises at least one seismic source and at least one streamer and acoustic ranging is performed between the streamer and the seismic source.

10. The method of claim 1 wherein the seismic spread comprises at least two streamers and acoustic ranging is performed between the two or more streamers.

11. The method of claim 1 wherein the measuring a sufficient number of orientation parameters of the rigid body comprises using one or more inertial measuring units.

12. The method of claim 1 wherein the measuring a sufficient number of orientation parameters of the rigid body comprises measuring at least three parameters.

13. The method of claim 12 wherein the measuring of at least three parameters employs measurements selected from the group consisting of a) three satellite antennae; b) two satellite antennae and one compass reading; c) three inertial measuring units; d) two inertial measuring units and one satellite antenna; e) one inertial measuring unit and two satellite antennae; f) an inertial navigation system; g) an attitude heading reference system; and h) an attitude heading reference system corrected using a satellite antenna.

14. A method comprising:
   a) determining the coordinates of a first point rigidly attached to a rigid body floating on the sea surface in a desired coordinate frame;
   b) measuring a sufficient number of orientation parameters of the rigid floating body to determine 3D offset in the coordinate reference frame of the first point to any point on or rigidly attached to the rigid body;
   c) applying the 3D coordinate shift from the first point to a second point rigidly attached to the body floating on the sea surface and thus determining the coordinates of the second point in the desired reference frame of the first point;
   d) determining on a shipboard computer or other in-sea central processing unit a 3D coordinate shift using distance, inclination, and heading from the second point to one or more components of the towed underwater seismic spread; and
   e) determining relative positions of two or more components of a towed underwater seismic spread to each other and to the one or more components attached to the rigid body in the desired coordinate reference frame.

15. The method of claim 14, wherein the second point comprises an attachment point of a tail buoy adaptor section.

16. The method of claim 14 wherein the seismic spread comprises a single streamer and acoustic ranging is performed between sections of the streamer.

17. The method of claim 14 wherein the seismic spread comprises at least two streamers and acoustic ranging is performed between the two or more streamers.

18. The method of claim 14 wherein the seismic spread comprises a seismic source array and acoustic ranging is performed between an acoustic device on the source array and the streamer.

19. The method of claim 14 wherein the measurement of the inclination and the heading employs one or more inclinometers and compasses.

20. The method of claim 15 comprising measuring attitude and heading of the tail buoy adapter section.

21. The method of claim 14 comprising measuring a sufficient number of orientation parameters and distances of both the rigid body and a physical connection between the rigid body and one or more components of the towed seismic spread, with accuracy that limits the coordinate transformation error from GNSS antenna to towed seismic spread component to less than a meter.

22. The method of claim 21 wherein the measuring of a sufficient number of orientation parameters employs measurements selected from the group consisting of a) three satellite antennae; b) two satellite antennae and one compass reading; c) three inertial measuring units; d) two inertial measuring units and one satellite antenna; e) one inertial measuring unit and two satellite antennae; f) an inertial navigation system; g) an attitude heading reference system; and h) an attitude heading reference system corrected using one of the satellite antennae.

23. The method of claim 14 wherein the desired reference frame is selected from the group consisting of a reference frame of a streamer, a navigation reference frame, and an earth-centered earth-fixed reference frame.

24. A seismic data acquisition system comprising a towed marine seismic spread, the spread comprising:
 a) a plurality of underwater seismic components;
 b) a rigid body floating on a surface of a body of water above the underwater seismic components;
 c) means for determining coordinates of a first point rigidly attached to the rigid body in a desired coordinate reference frame;
 d) means for measuring sufficient orientation parameters of the rigid body to determine a 3D offset in the coordinate reference frame of a first point to any point on or rigidly attached to the rigid body;
 e) means for applying a 3D coordinate shift from the first point to a second point rigidly attached to the body floating on the sea surface and thus determining the coordinates of the second point in the desired reference frame of the first point;
 e) a shipboard sub-system computing a distance from the second point fixed to the rigid body to one or more devices that are components of the spread, by comparing transmission times of a signal to recording times of transmitted signals and further multiplying by a signal propagation rate, and determining relative positions of components of the marine seismic spread to each other and to one or more of the devices rigidly attached to the rigid body floating on the sea surface in the desired coordinate reference frame.

25. The system of claim 24 wherein the rigid body is a buoy and the components of the underwater seismic network comprise a plurality of seismic streamers and/or sources.

26. A system comprising:
 a) a plurality of underwater seismic components;
 b) a rigid body floating on a surface of a body of water above the underwater seismic components;
 c) means for determining coordinates of a first point rigidly attached to the rigid body in a desired coordinate reference frame;
 d) means for measuring sufficient orientation parameters of the rigid body to determine a 3D offset in the coordinate reference frame of a first point to any point on or rigidly attached to the rigid body;
 e) means for applying a 3D coordinate shift from the first point to a second point rigidly attached to the body floating on the sea surface and thus determining the coordinates of the second point in the desired reference frame of the first point;
 f) a shipboard sub-system computing a 3D coordinate shift using distance, inclination, and heading from the second point fixed to the rigid body to one or more devices that are components of the spread, and determining positions of two or more components of the towed underwater seismic spread relative to each other and to one or more points on the rigid body in the desired coordinate reference frame.

27. The system of claim 26 comprising means for measuring a sufficient number of orientation parameters of the streamer at the point sufficient to provide sub-meter accuracy in the relating of coordinates of one of the satellite antennae to coordinates of the acoustic node.

28. A method comprising:
 a) determining the coordinates of a first point rigidly attached to a rigid body floating on the sea surface in a coordinate frame;
 b) measuring a sufficient number of orientation parameters of the rigid body to determine a 3D offset in the coordinate frame of the first point to a second point, wherein (a) the second point is submerged and connected to a submerged coupling member, both of which are pivotally and non-rigidly coupled to the rigid body, (b) the second point and coupling member are both coupled between the rigid body and a portion of a streamer, and (c) the first point, the second point, and the coupling member are all arranged non-collinearly with each other;
 c) determining the 3D offset;
 d) based on the determined 3D offset, applying a 3D coordinate shift from the first point to the second point and thus determining the coordinates of the second point in the coordinate frame; and
 e) determining on a shipboard computer or other in-sea central processing unit an additional 3D coordinate shift using distance, inclination, and heading from the second point to one or more components of the towed underwater seismic spread.

29. The method of claim 28, wherein the coupling member includes a flexible tail buoy adapter section (TBAS) and the method further includes measuring the sufficient number of orientation parameters when the flexible TBAS is non-linear and includes slack.

30. The method of claim 29, including determining a linear distance present between a first end of the TBAS and a second end of the TBAS while the flexible TBAS is non-linear and includes slack.

* * * * *